March 13, 1934.    A. V. D. WILLGOOS    1,950,467
VALVE COOLING MEANS
Filed Jan. 5, 1931    2 Sheets-Sheet 1
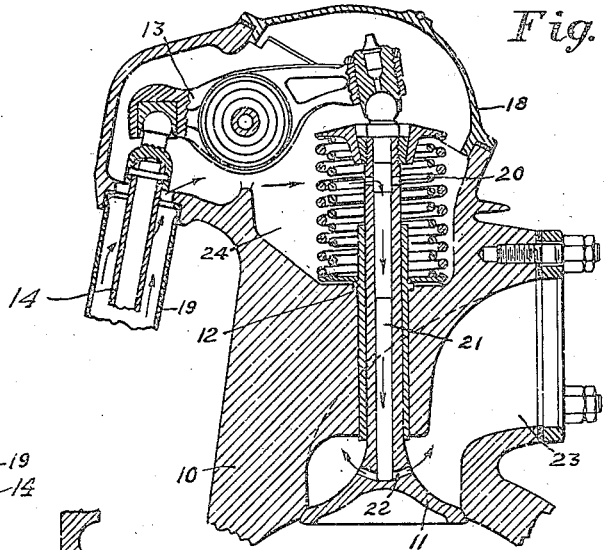
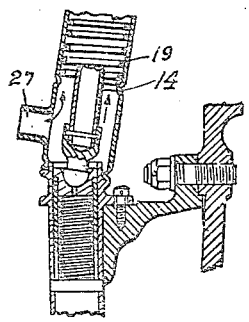
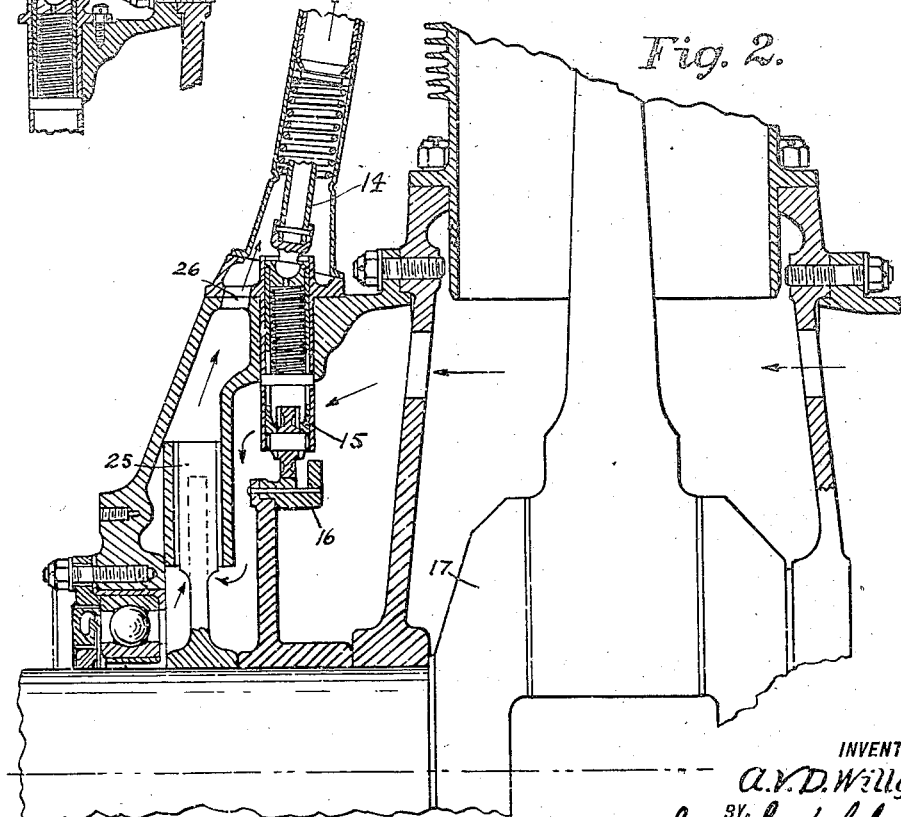
INVENTOR
A. V. D. Willgoos
ATTORNEY March 13, 1934. A. V. D. WILLGOOS 1,950,467
VALVE COOLING MEANS
Filed Jan. 5, 1931  2 Sheets-Sheet 2

INVENTOR
A. V. D. Willgoos
BY Joseph H. Schofield
ATTORNEY

Patented Mar. 13, 1934

1,950,467

UNITED STATES PATENT OFFICE 1,950,467

VALVE COOLING MEANS

Andrew V. D. Willgoos, West Hartford, Conn., assignor to The Pratt & Whitney Aircraft Company, Hartford, Conn., a corporation of Delaware Application January 5, 1931, Serial No. 506,586

5 Claims. (Cl. 123—177)

This invention relates to valves for internal combustion engines and particularly to a means of maintaining a valve at a reasonable temperature.

A primary object of the present invention is to provide improved air circulating means through portions of a valve enabling the valve to be substantially cooled.

Another object of the invention is to provide an air admitting means under pressure to the hollow stem of an internal combustion engine valve at its outer end and means to permit the air to escape from the valve stem adjacent the head portion.

And finally it is an object of the invention to supply air to the enclosed outer end of a valve of an internal combustion engine and provide means to continuously conduct the air through the stem and within the guiding portions of the valve and then allow the air to escape at the inner end thereof adjacent the valve head where it may mingle with the gases within the passages of the enclosing head within which the valve is mounted.

With these and other objects in view, my invention includes the features of construction and operation set forth in the following specification and illustrated in the accompanying drawings.

In the accompanying drawings annexed hereto and forming a part of this specification, I have shown my invention embodied in a radial type aircraft engine and applied to an exhaust valve thereof, but it will be understood that the invention can be otherwise embodied and that the drawings are not to be construed as defining or limiting the scope of the invention, the claims appended to this specification being relied upon for that purpose.

In the drawings:

Figure 1 is a sectional view taken longitudinally of a valve made in accordance with the present invention and shown in operative position within a portion of its enclosing head.

Fig. 2 is a fragmentary sectional view of the crank case portion of an internal combustion engine showing one form of air supplying means for a valve.

Fig. 3 is a detail view of the lower end of a valve operating rod and enclosing tube which may be used with the present invention.

Figure 4:
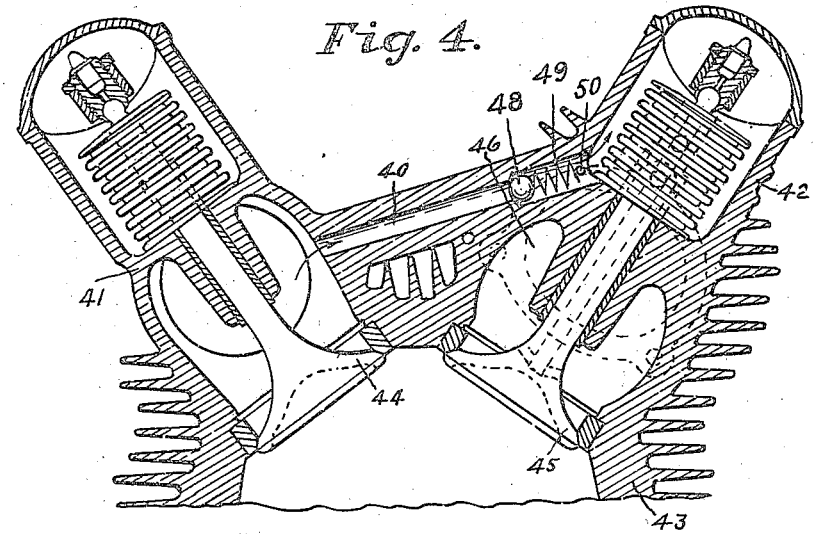
Figure 5:
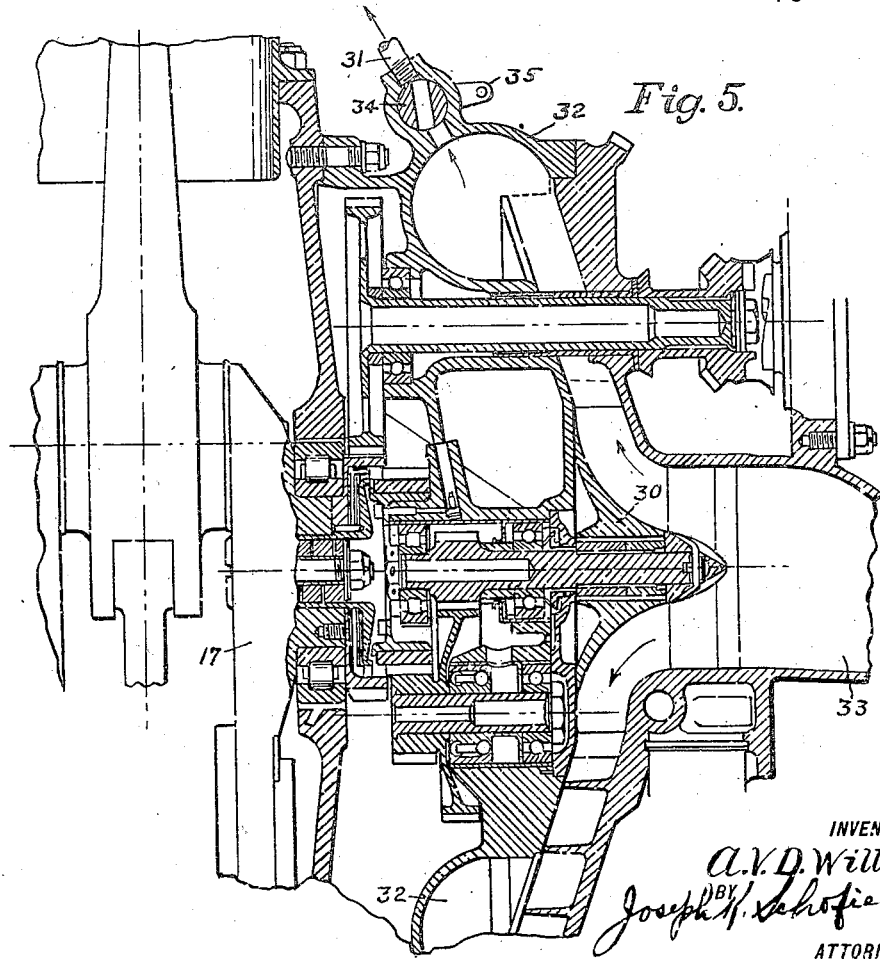

Fig. 4 is a sectional view of a portion of a combustion head provided with intake and exhaust valves showing a passage for conveying air from an intake passage to the space surrounding an exhaust valve made according to the present invention, and Fig. 5 is a central sectional view showing intake passages for a radial type internal combustion engine from which air may be supplied in regulated volume for cooling the valves.

In the above mentioned drawings I have shown several embodiments of the invention which are now deemed preferable, but it is to be understood that changes and modifications may be made within the scope of the appended claims without departing from the spirit of the invention.

In the operation of internal combustion engines of high speed and heavy duty, the valves, more particularly the exhaust valves, are subjected to abnormally high temperatures. This extremely high temperature is one of the principal causes of failure of exhaust valves. It induces rapid wear of the guiding portions due to impossibility of maintaining efficient lubrication and also causes deformation of the valve head and seat, inducing leakage and reducing both strength and durability. It is proposed, therefore, in accordance with the present invention, to provide means for maintaining a continuous circulation of cool air longitudinally through the valve stem so that the entire valve stem will be subjected to the cooling influence of this incoming air up to a point directly adjacent the head. Several means are proposed for supplying the air under positive pressure to the outer enclosed ends of the valves. A special blower may be used which may be conveniently mounted on the main crank shaft. Also this air may be obtained under increased pressure directly from the intake passages of the engines at convenient points beyond the supercharger. After passing through the length of the valve stem the cooling air may be allowed to escape through lateral openings within the stem directly into passages within the combustion head for the exhaust gases. The valve stem, as shown in Fig. 1, is therefore cooled throughout its length and, by conduction of heat along the metal of the stem from the head, the head is also materially cooled.

Referring more in detail to the figures of the drawings, I provide a combustion head 10 for an internal combustion engine of conventional or standard form within which operates a valve 11 of the poppet or mushroom type. This valve 11 is slidably mounted within a tube or sleeve 12 inserted within the combustion head 10, the beveled surfaces of the valve head engaging correspondingly beveled surfaces of the combustion head 10. The operating means for the valve 11 comprise a rocker arm 13 actuated by a rod 14 and tappet 15 by means of a cam 16 mounted on the main cam shaft 17 of the engine. All of this mechanism is suitably enclosed within an enclosing portion for the valve operating means 13 and the cover plate 18, which may be held down in pressure tight relation to the enclosing portions of the combustion head 10 in any preferred manner. An enclosing tube 19 presently to be more fully described is provided within which the operating rod 14 is movable.

Adjacent the outer end of the stem of the valve 11 are lateral openings 20 extending into a central longitudinal hole 21 extending substantially the entire length of the valve 11. Also closely adjacent the head portion of the valve 11 are other lateral openings 22 extending into the extreme inner end of this longitudinal opening 21. Air admitted to the openings 20 at the outer end of the valve 11 may therefore, after passing substantially the entire length of the valve, be allowed to escape through the passages 22 within the valve 11 and mingle with the exhaust gases within the passage 23.

In order to supply air continuously to this hollow valve stem a supply of air is provided for the space 24 within the chamber formed by the valve enclosure and cover plate 18. For that purpose a blower or impeller 25 may be mounted directly upon the main crank shaft 17 of the engine so that rotation of the shaft will force air admitted to the crank case at any convenient points radially outwardly into the spaces within the tubes 19 for the valve operating rods 14. These tubes 19 are connected by openings 26 within a frame member with the space occupied by the impeller 25 and will therefore permit a large quantity of air to be continuously supplied to the spaces 24 from which space this air may be admitted to the valve stems as above described.

In lieu of an impeller 25 being mounted upon the main crank shaft 17, any auxiliary device or air pump may be employed suitably driven by the engine or by an auxiliary source of power. The air thus forced under pressure may be admitted to the tubes 19, a special opening 27 being provided for that purpose. This is shown in Fig. 3. The ends of the tubes 19 adjacent the crank case, as shown in Fig. 3, in this form of the invention are of standard or usual type and entirely closed, thus forcing the air admitted through the branch openings 27 to enter the rocker arm housings and the valve stems.

In engines of the Diesel type and equipped with superchargers 30, such as shown in Fig. 5, for increasing the pressure and quantity of air supplied to the cylinders before it is mixed with the fuel, one or more conduits 31 may be provided leading from the collector ring 32 of the supercharger chamber. From these points air may be directly supplied to the branch openings 27 in the valve operating rod tubes 19. A supercharger chamber and adjacent parts of an intake are shown in Fig. 5 of the drawings in which is provided a centrifugal impeller 30 driven by the main shaft 17 and operating within the intake 33 to discharge air into the collector ring 32 substantially concentric with the main shaft 17. For each cylinder a connection may be made to the collector ring within which a regulating valve 34 may be operated so that the air at a pressure substantially above atmosphere may be admitted directly to the valve enclosures 24. Levers 35 attached to the valves 34 enable the valves to be properly adjusted.

A still further modification of the invention is shown in Fig. 4 which includes the provision of a conduit 40 between the valve housings 41 and 42 of a combustion head 43. The intake valve 44 and its enclosure and chamber are shown at the left and may be of standard or usual construction for admitting air unmixed with fuel to the combustion head 10. The space within this head 41 is continuously supplied with the incoming air in the usual manner, as by an intake passage preferably supplied with a supercharger. A portion of this air is allowed to pass through the conduit 40 leading from this enclosure in the head 41 into the housing 42 for the exhaust valve 45. This exhaust valve 45 is, as indicated, made similar to that shown more in detail in Fig. 1 and permits air within its chamber to be admitted to its hollow stem and escape into the exhaust passages 46 surrounding the head portion of the valve.

Within the conduit 40 is interposed a check valve 48 shown in the form of a ball. A light spring 49 engages this ball 48 and normally holds it in its closed position. A pin 50 or any other convenient means may be employed to hold the spring 49 in operative position against the ball valve 48. With this check valve 48 in the conduit 40 retrograde movement of the air through it is prevented. Under running conditions with the engine throttle valve but partly open and with reduced pressure within the intake valve enclosing head 41, no gases from the exhaust passages 46 can enter the enclosing head 41.

What I claim is:

1. A valve cooling means for internal combustion engines comprising in combination, a combustion head, valve enclosing portions thereon, valves movable therein, means to force air into one of said enclosing heads, means permitting passage of said air from one enclosing head to the other and thence through a valve therein substantially throughout its length, and means permitting escape of said air from said valve into constantly open passages adjacent thereto.

2. An internal combustion engine comprising in combination, a combustion head, intake and exhaust valves therein, enclosing heads for said valves formed in said combustion head, means for supplying air under pressure above the surrounding atmosphere to said intake valve enclosing head, means to supply a portion of the air forced into said intake valve enclosing head to the exhaust valve enclosing head, and means permitting passage of air through the stem of said exhaust valve.

3. An internal combustion engine comprising in combination, a combustion head, intake and exhaust valves therein, enclosing heads for said valves formed in said combustion head, means for supplying air under pressure above the surrounding atmosphere to said intake valve enclosing head, means to supply a portion of the air forced into said intake valve enclosing head to the exhaust valve enclosing head, means preventing retrograde movement of air through said supplying means, and means permitting passage of air through the stem of said exhaust valve.

4. An internal combustion engine comprising in combination, a combustion cylinder and head, intake and exhaust valves therefor, a supercharger for delivering air under pressure to said cylinder, a housing for said exhaust valve and its operating means, conduit means for admitting air from said supercharger to said housing, and conduit means through the stem of said valve whereby air may be admitted to the outer end of said valve and exhausted from adjacent the valve head with the exhaust gases from said cylinder.

5. A cooling system for valves comprising in combination, a combustion head, a valve therein having a hollow stem throughout its length, a housing enclosing the outer end of said valve stem and the operating means therefor formed in said combustion head, means to continuously admit air under pressure through said housing to the hollow stem adjacent the outer end thereof, a check valve in said admitting means, and means to permit said air to exhaust from said stem adjacent the head of the valve.

ANDREW V. D. WILLGOOS.